United States Patent [19]

Kyle

[11] Patent Number: 5,042,168
[45] Date of Patent: Aug. 27, 1991

[54] HORTICULTURAL MEASURING APPARATUS

[76] Inventor: Kipp J. Kyle, 9200 Melody Rd., Lake Worth, Fla. 33467-4750

[21] Appl. No.: 597,551

[22] Filed: Oct. 15, 1990

[51] Int. Cl.⁵ .............................................. G01B 3/08
[52] U.S. Cl. ....................................... 33/809; 33/299
[58] Field of Search ................. 33/809, 404, 832, 1 H, 33/296, 293–295, 299; 248/530, 533, 346, 347, 902; 116/173

[56] References Cited

U.S. PATENT DOCUMENTS

| 325,134 | 8/1985 | Wainwright | 33/809 |
|---|---|---|---|
| 2,554,887 | 5/1951 | Tricarico | 248/156 X |
| 2,601,088 | 6/1952 | Burgess | 116/173 X |
| 3,516,171 | 6/1970 | Martin | 33/293 |
| 3,843,079 | 10/1974 | Reisling | 248/530 |
| 4,326,352 | 4/1982 | Barth | 248/545 X |

FOREIGN PATENT DOCUMENTS

| 1557852 | 1/1969 | France | 248/530 |
|---|---|---|---|
| 2560687 | 9/1985 | France | 33/809 |

Primary Examiner—Harry N. Haroian
Attorney, Agent, or Firm—Leon Gilden

[57] ABSTRACT

A measuring instrument for use in the measuring of horticultural growth defined as a base tube, including series of tubes of progressively decreasing diameters, each telescopingly receivable within an underlying tube defining five to seven sections, each of a predetermined gradation. The tube structure is mounted within a socket of a support plate, with the support plate secured for support of the extensible tubes.

3 Claims, 3 Drawing Sheets

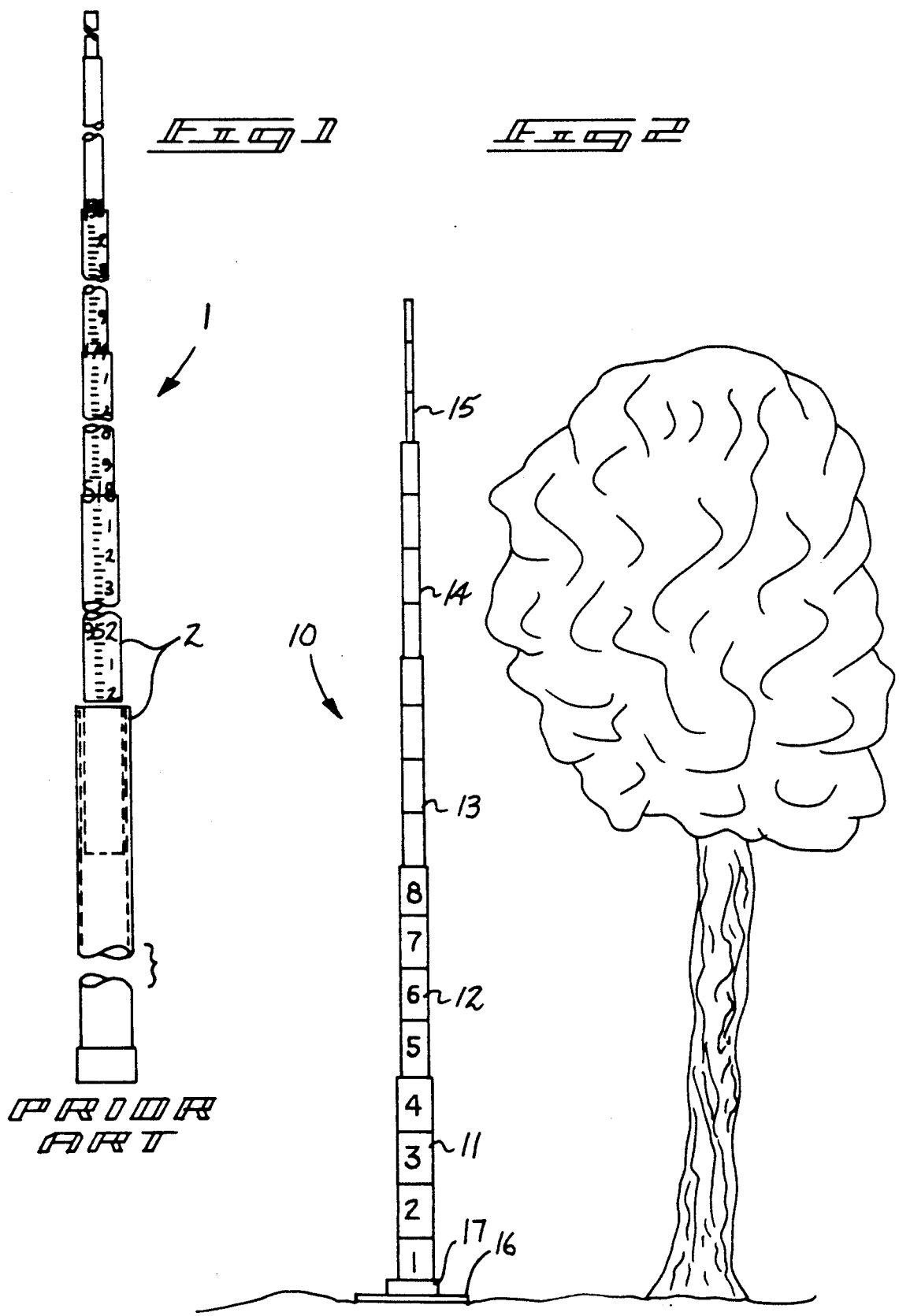

HORTICULTURAL MEASURING APPARATUS

BACKGROUND OF THE INVENTION

1. Field of the Invention

The field of invention relates to measuring apparatus, and more particularly pertains to a new and improved horticultural measuring apparatus wherein the same is arranged for convenient and efficient measuring of various plant growths, such as trees and the like.

2. Description of the Prior Art

Measuring equipment of various types for measuring vertical extent of various members has been utilized in the prior art. However such structure has limited application in organization in extensive length, as they have frequently been of a bulky or expansive construction, and typically of a weight limiting their manual manipulation. Examples of the prior art include U.S. Pat. No. 3,492,729 to Crain wherein a measuring rod utilizes extensible pole sections, with locking clamps utilized to maintain each section relative to one another.

U.S. Pat. No. 4,621,431 to Fatool, et al. sets forth a telescoping device utilizing a pin and groove mechanism to maintain alignment and positioning of the sections relative to one another.

U.S. Pat. No. 4,318,228 to Kimura sets forth a pole utilizing elliptical liners to permit extension relative to one another, and spring-type clamps mounted within each of the extensible liners to effect locking relative to one another.

U.S. Pat. No. 4,471,532 to Francis sets forth a graduated measuring rod, including a fixed scale having display windows, with one or more sliding members slidable behind the fixed members and supporting a plurality of sets of sliding members resulting in different sequences of numbers displayed in the windows.

U.S. Pat. No. 3,808,690 to Balder sets forth a further example of a telescoping measuring device utilizing a pivot axis mounted at a lowermost end thereof defined by a "V" shaped frame to permit positioning of the lowermost support rod within a corner portion of a structure.

As such, it may be appreciated that there continues to be a need for a new and improved horticultural measuring apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of measuring apparatus now present in the prior art, the present invention provides a horticultural measuring apparatus wherein the same permits the use of extensible rod members formed of a lightweight and manipulatable organization to permit measuring of various horticultural categories of plants. As such, the general purpose of the present invention, which will be described subsequently in greater detail, is to provide a new and improved horticultural measuring apparatus which has all the advantages of the prior art measuring apparatus and none of the disadvantages.

To attain this, the present invention provides a measuring instrument for use in the measuring of horticultural growth defined as a base tube, including series of tubes of progressively decreasing diameters, each telescopingly receivable within an underlying tube defining five to seven sections, each of a predetermined gradation. The tube structure is mounted within a socket of a support plate, with the support plate secured for support of the extensible tubes.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved horticultural measuring apparatus which has all the advantages of the prior art measuring apparatus and none of the disadvantages.

It is another object of the present invention to provide a new and improved horticultural measuring apparatus which may be easily and efficiently manufactured and marketed.

It is a further object of the present invention to provide a new and improved horticultural measuring apparatus which is of a durable and reliable construction.

An even further object of the present invention is to provide a new and improved horticultural measuring apparatus which is susceptible of a low cost of manufacture with regard to both materials and labor, and which accordingly is then susceptible of low prices of sale to the consuming public, thereby making such horticultural measuring apparatus economically available to the buying public.

Still yet another object of the present invention is to provide a new and improved horticultural measuring apparatus which provides in the apparatuses and methods of the prior art some of the advantages thereof, while simultaneously overcoming some of the disadvantages normally associated therewith.

Still another object of the present invention is to provide a new and improved horticultural measuring apparatus wherein the same is of a lightweight, readily manipulatable organization readily secured and stored during periods of non-use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view, taken in elevation, of a prior art measuring rod apparatus.

FIG. 2 is an orthographic view, taken in elevation, of the instant invention in use.

DESCRIPTION OF THE PREFERRED EMBODIMENT

Figure 3:
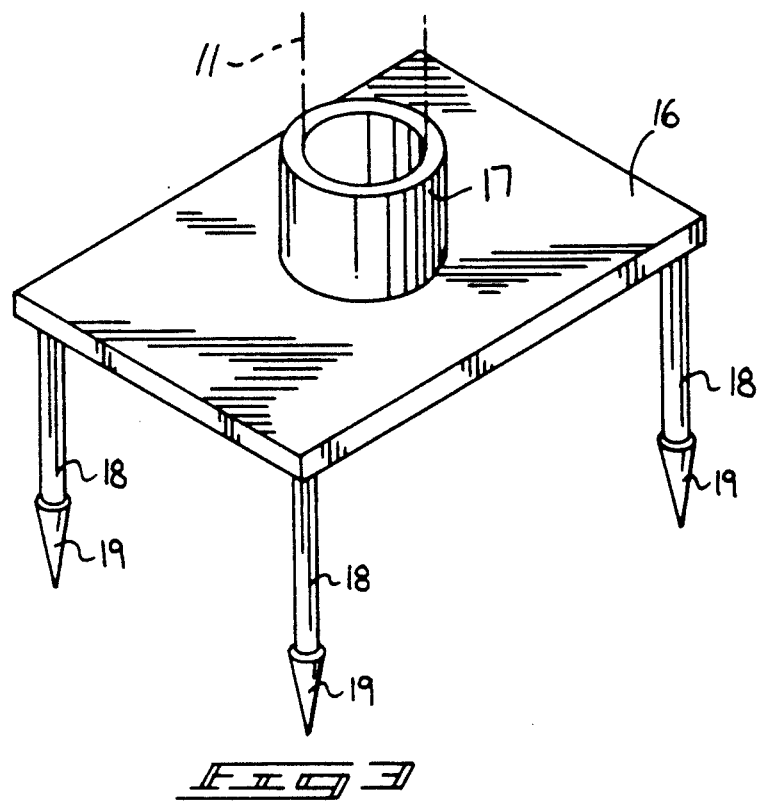
FIG. 3 is an isometric illustration of the base support apparatus utilized by the instant invention.

With reference now to the drawings, and in particular to FIGS. 1 to 6 thereof, a new and improved horticultural measuring apparatus embodying the principles and concepts of the present invention and generally designated by the reference numeral 10 will be described.

FIG. 1 illustrates a prior art measuring rod apparatus 1 utilizing a series of pole members 2 mounted telescopingly and coaxially relative to one another utilizing a clamp structure to maintain the poles in an extended relationship, in a manner as set forth in U.S. Pat. No. 3,492,729.

More specifically, the horticultural measuring apparatus 10 of the instant invention essentially comprises, a base tube 11 telescopingly receiving in a coaxial relationship a first extensible tube 12 within the base tube 11. The first tube 12 in a like manner telescopingly receives a second tube 13, with the second tube 13 telescopingly receiving a third tube 14, with the third tube 14 including a fourth tube 15 telescopingly received therewithin. Each of the tubes are frictionally rotated relative to one another in a desired extended relationship. Further, the tubes are typically formed of a lightweight material of polymeric resin and the like, or other suitable material, to minimize weight in use of the apparatus to enhance manipulation thereof. Further, it is understood that it is desired to typically use five to seven sections, with each section defined as a separate tube. Each of the tubes are coaxially aligned relative to one another, with an external diameter of an upper tube substantially equal to an internal diameter of an underlying tube to promote frictional engagement of the tubes in an extended relationship. Further, the tubes are in four foot sections, each defining gradations of one foot, where it is understood, however, that various gradations may be utilized depending upon the desired length to be measured of an object. The support plate 16, with a socket 17, receives the lowermost end of the base tube 11 therewithin to provide stability to the tube structure to permit its free-standing orientation relative to a tree structure and the like, as illustrated in FIG. 2.

Figure 4:
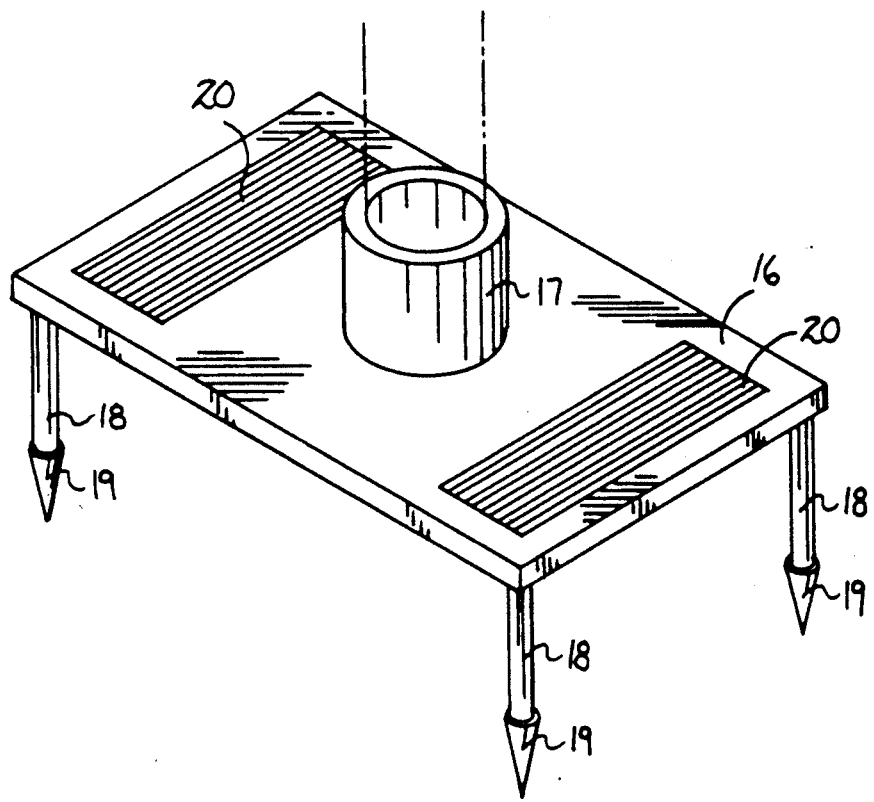
FIG. 4 is an isometric illustration of a further base member utilized by the instant invention.

FIG. 3 illustrates the support plate 16 and socket 17, with the socket 17 medially and orthogonally mounted to the top surface of the support plate 16. A series of leg members 18 are orthogonally and fixedly mounted adjacent each corner of the rectangular plate member 16 extending downwardly therefrom, with each leg member 18 defined by a predetermined first diameter. Each leg member includes an inverted conical projection 19 fixedly mounted in a coaxial relationship relative to the leg member at a lower terminal end of each leg member, with the base of each conical projection defined by a second diameter substantially greater than the first diameter to anchor the plate member within the underlying ground support. FIG. 4 illustrates the support plate 16 utilizing a plurality of resilient polymeric inserts 20 that are mounted within the top surface of the support plate arranged parallel relative to one another adjacent opposed end edges of the support plate 16 to permit an individual to provide a friction surface and enable the individual to stand upon the plate member 16, and more particularly upon the inserts to direct the plate member forcefully into the underlying ground support.

Figure 5:
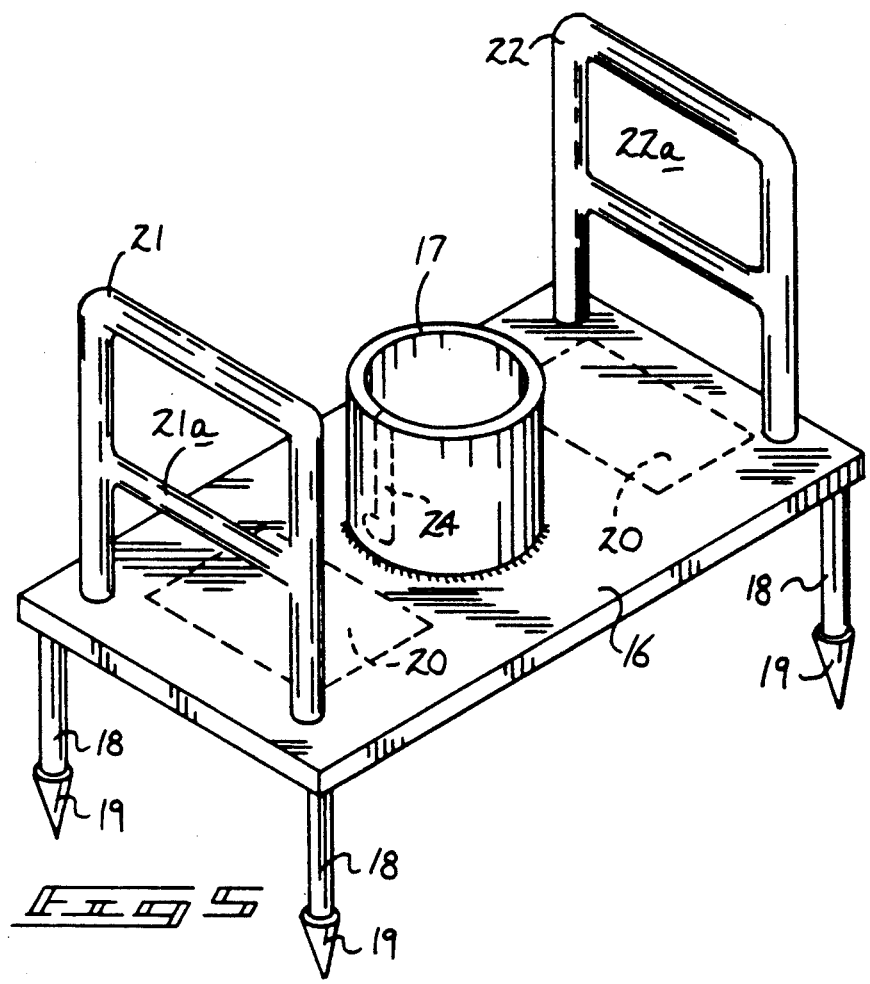
FIG. 5 is an isometric illustration of a yet further modified base member utilized by the instant invention.
Figure 6:
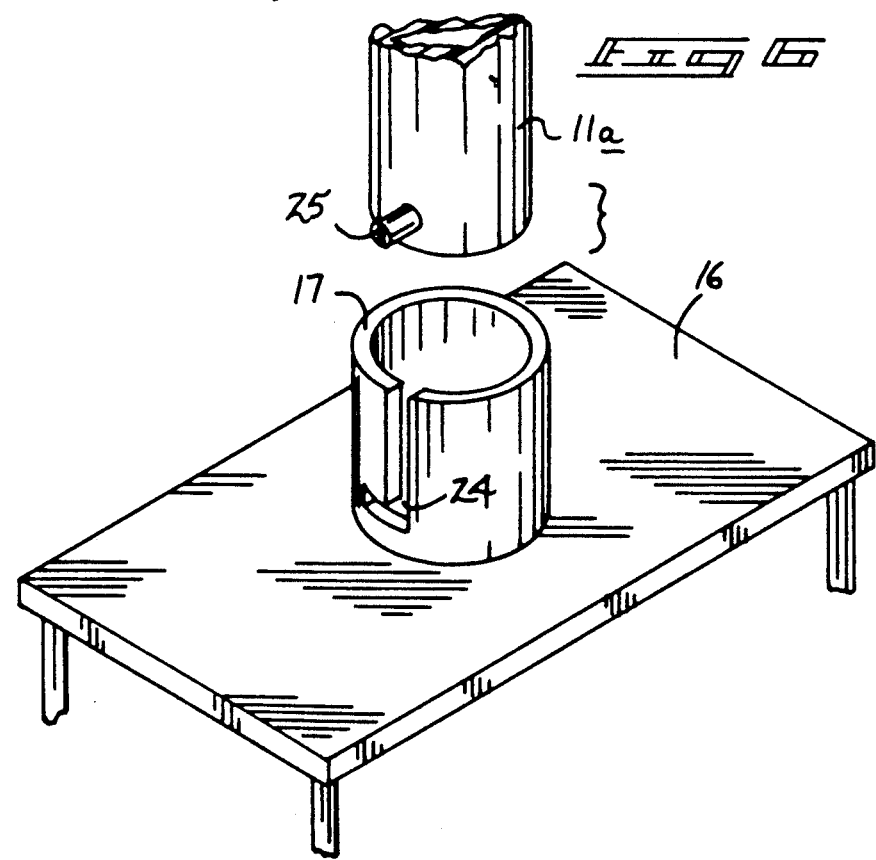
FIG. 6 is an isometric illustration in detail and an interconnection between the base tube and the support socket utilized by the instant invention.

FIG. 5 illustrates the plate member 16 employing a "U" shaped handle structure, with a first "U" shaped handle 21 and a second "U" shaped handle 22 provided adjacent the opposed end edges of the plate 16 and projecting orthogonally upwardly from the top surface of the support plate 16 between each insert 20 and an adjacent end edge, as illustrated in FIG. 5. Further, the socket 17 is formed with an "L" shaped slot 24 to receive a lock rod 25 orthogonally and integrally mounted adjacent a lower terminal end of the base tube 11, wherein the lock rod 25 is directed through the "L" shaped slot 24 to fixedly secure the base tube and associated extensible tube structure of the first through fourth tubes 12 through 15 relative to the base plate 16.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A horticultural measuring apparatus comprising,
   a plurality of tubes telescopingly assembled for extension and retraction relative to each other, the plurality of tubes including a base tube, with the base tube including a lower terminal end, and a support plate, the support plate including a top surface and a bottom surface, with the top surface including a socket orthogonally and fixedly mounted to the top surface, with the socket defined by an internal socket diameter, and the base tube defined by a external base tube diameter, wherein the socket diameter substantially equals the base tube diameter, and wherein the support plate is of a generally rectangular configuration and includes a leg member fixedly and orthogonally mounted to the bottom surface of the support plate adjacent each corner of the support plate, and each leg member includes an inverted conical projection, wherein each inverted conical projection is coaxially aligned with each respective leg member, and wherein each leg member is cylindrical an defined by a predetermined first diameter, and the conical projection is defined by a base defined by a second diameter, wherein the second diameter is substantially greater than the first diameter, and wherein the support plate includes a plurality of resilient polymeric inserts fixedly mounted within the top surface of the support plate, the support plate defined by spaced parallel side edges, and a resilient polymeric insert positioned between each side edge and the socket, with the resilient polymeric inserts arranged parallel relative to one another.

2. An apparatus as set forth in claim 1 including a "U" shaped handle orthogonally and fixedly mounted to the top surface of the support plate between each insert and each side edge, and each "U" shaped handle includes an intermediate rod arranged parallel to a base rod of each "U" shaped handle to permit grasping of each handle for removal of the support plate relative to an underlying ground support surface.

3. An apparatus as set forth in claim 2 wherein the socket includes an "L" shaped slot formed through the socket, and the base tube includes a lock rod fixedly mounted to the base tube and orthogonally oriented relative to an axis defined by the base tube, wherein the lock rod is positioned adjacent the lower terminal end of the base tube for reception within the "L" shaped slot.

\* \* \* \* \*